United States Patent
Altschuler et al.

[11] Patent Number: 6,151,585
[45] Date of Patent: *Nov. 21, 2000

[54] METHODS AND APPARATUS FOR DETERMINING OR INFERRING INFLUENTIAL RUMORMONGERS FROM RESOURCE USAGE DATA

[75] Inventors: Steven J. Altschuler; Lani F. Wu, both of Redmond, Wash.; David Ingerman, New York, N.Y.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 09/065,970

[22] Filed: Apr. 24, 1998

[51] Int. Cl.[7] .................................................. G06F 17/60
[52] U.S. Cl. .............................. 705/10; 705/1; 705/500; 705/8; 705/9; 705/7
[58] Field of Search ................................ 705/10, 1, 500, 705/8, 9, 7

[56] References Cited

U.S. PATENT DOCUMENTS

| | | | |
|---|---|---|---|
| 5,371,673 | 12/1994 | Fan | 704/1 |
| 5,521,814 | 5/1996 | Teran et al. | 700/266 |
| 5,692,178 | 11/1997 | Shaughnessy | 395/608 |
| 5,712,985 | 1/1998 | Lee et al. | 705/7 |
| 5,999,192 | 12/1999 | Gilman et al. | 345/440 |
| 6,014,628 | 1/2000 | Kovarik | 705/1 |
| 6,021,403 | 2/2000 | Horvitz et al. | 706/45 |

FOREIGN PATENT DOCUMENTS 0 397 992 A2  11/1990  European Pat. Off. .

OTHER PUBLICATIONS

Silberschatz, Avi, "Database Systems: Achievements and Opportunities", Communications of the ACM, vol. 34, No. 10, pp. 110–120, Oct. 1991.

Hall, William S., "Internationalization in Windows NT, part II: locales, languages, and resources", Microsoft Systems Journal, v9, n7, pp. 55(18), Jul. 1994.

Kornfeld, Ari, "Casual diagrams: clarifying uncertainty", AI Expert, v6, n11, p. 42 (8), Oct. 1991.

Venkatesh, S., Deadlock detection and resolution for discrete-event simulation: multiple unit seizes, IIE Transactions, v30, n3 p. 201(16), Mar. 1998.

*Primary Examiner*—Tod R. Swann
*Assistant Examiner*—Akiba Robinson-Boyce
*Attorney, Agent, or Firm*—Michaelson & Wallace; Peter L. Michaelson

[57] ABSTRACT

Resource usage data is used to infer degrees of influence between users. Once such inferences are made, a directed graph representation of the users and the inferred "influence" between the users can be generated. "Influential rumormongers" can then be determined from the directed graph, for example, by using a greedy graph covering algorithm. In this way, marketing information can be targeted to "influential rumormongers" to optimize its dissemination and impact. If actual (explicit) data regarding the influence between users is known, such data may be used to refine or replace at least some edge values.

26 Claims, 15 Drawing Sheets

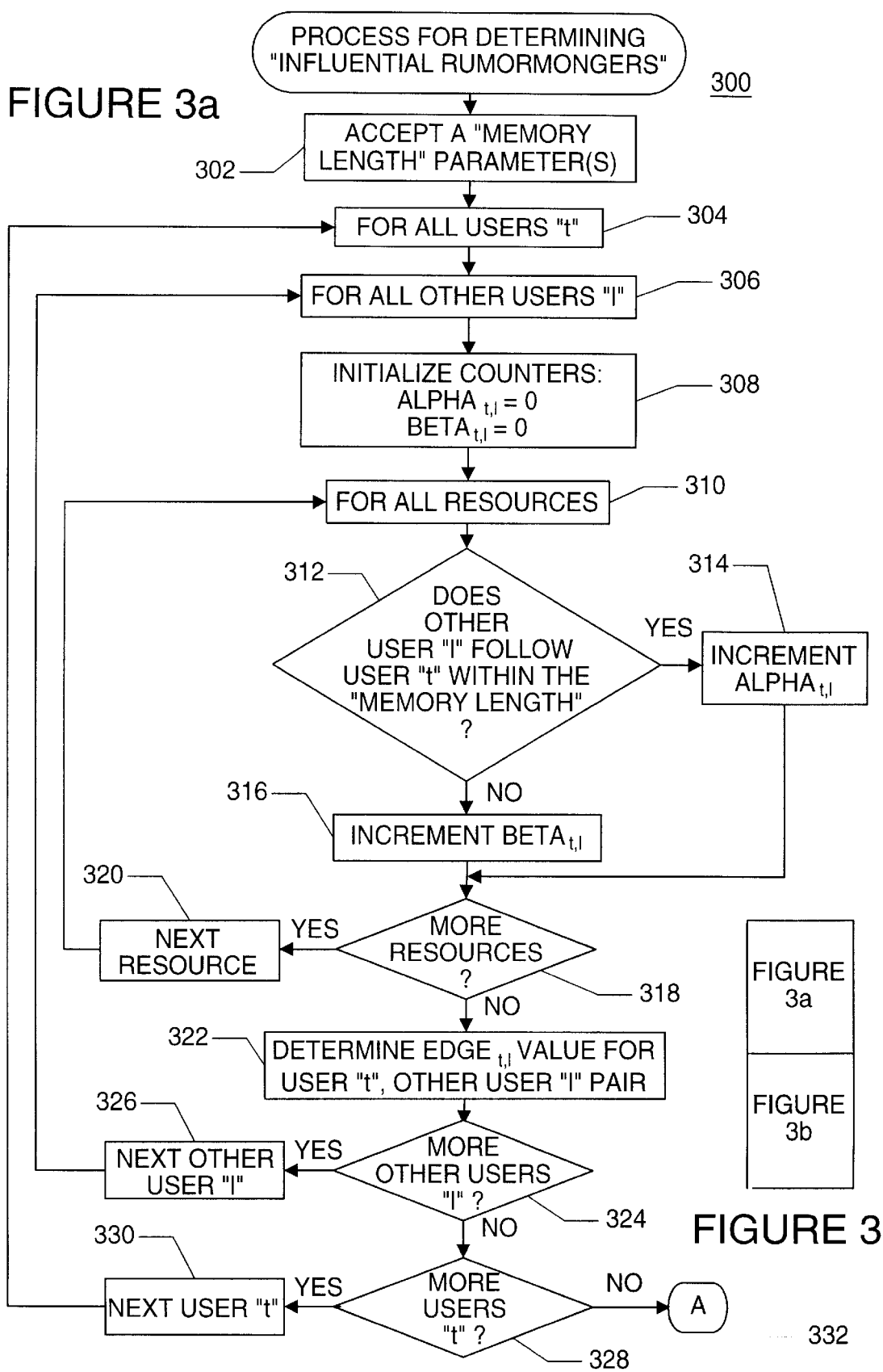

| USER ID | RESOURCE ID | DATE/TIME STAMP | |
|---|---|---|---|
| F | 1 | 9/1/97 | 13:00 |
| B | 1 | 9/1/97 | 14:15 |
| A | 1 | 9/1/97 | 14:45 |
| C | 1 | 9/1/97 | 21:00 |
| D | 1 | 9/2/97 | 14:30 |
| E | 2 | 9/2/97 | 09:15 |
| A | 2 | 9/2/97 | 22:00 |
| C | 2 | 9/2/97 | 22:30 |
| F | 3 | 9/1/97 | 07:15 |
| E | 3 | 9/2/97 | 19:15 |

FIGURE 7

| FIRST USER, FOLLOWING USER | RESOURCE 1 | RESOURCE 2 | RESOURCE 3 | ALPHA COUNT | BETA COUNT | EDGE VALUE |
|---|---|---|---|---|---|---|
| AB |   |   |   | 0 | 3 | 0 |
| AC | ✔ | ✔ |   | 2 | 1 | .66 |
| AD | ✔ |   |   | 1 | 2 | .33 |
| AE |   |   |   | 0 | 3 | 0 |
| AF |   |   |   | 0 | 3 | 0 |
| BA | ✔ |   |   | 1 | 2 | .33 |
| BC | ✔ |   |   | 1 | 2 | .33 |
| BD |   |   |   | 0 | 3 | 0 |
| BE |   |   |   | 0 | 3 | 0 |
| BF |   |   |   | 0 | 3 | 0 |
| CA |   |   |   | 0 | 3 | 0 |
| CB |   |   |   | 0 | 3 | 0 |
| CD | ✔ |   |   | 1 | 2 | .33 |
| CE |   |   |   | 0 | 3 | 0 |
| CF |   |   |   | 0 | 3 | 0 |
| DA |   |   |   | 0 | 3 | 0 |
| DB |   |   |   | 0 | 3 | 0 |
| DC |   |   |   | 0 | 3 | 0 |
| DE |   |   |   | 0 | 3 | 0 |
| DF |   |   |   | 0 | 3 | 0 |
| EA |   | ✔ |   | 1 | 2 | .33 |
| EB |   |   |   | 0 | 3 | 0 |
| EC |   | ✔ |   | 1 | 2 | .33 |
| ED |   |   |   | 0 | 3 | 0 |
| EF |   |   |   | 0 | 3 | 0 |
| FA | ✔ |   |   | 1 | 2 | .33 |
| FB | ✔ |   |   | 1 | 2 | .33 |
| FC | ✔ |   |   | 1 | 2 | .33 |
| FD |   |   |   | 0 | 3 | 0 |
| FE |   |   |   | 0 | 3 | 0 |

| USER ID | RESOURCE ID | DATE/TIME STAMP | |
|---|---|---|---|
| A | 1 | 9/1/97 | 22:00 |
| B | 1 | 9/1/97 | 23:15 |
| C | 1 | 9/2/97 | 14:00 |
| D | 1 | 9/3/97 | 7:00 |
| A | 1 | 9/1/97 | 20:15 |
| A | 1 | 9/1/97 | 23:00 |
| A | 1 | 9/2/97 | 18:30 |
| A | 1 | 9/3/97 | 17:45 |

| | TALKER, LISTENER | RESOURCE 1 | RESOURCE 2 | FREQ$_{t,1}$ | SUM FREQ$_L$ FOR ALL TALKERS | EDGE$_{t,1}$ |
|---|---|---|---|---|---|---|
| 1110a | AA | ✓ | ✓ | 2 | 4 | 0.5 |
| | AB | ✓ | ✓ | 2 | 4 | 0.5 |
| | AC | ✓ | | 1 | 4 | 0.25 |
| | AD | | | 0 | 4 | 0.0 |
| 1110b | BA | | | 0 | 4 | 0.0 |
| | BB | ✓ | ✓ | 2 | 4 | 0.5 |
| | BC | ✓ | | 1 | 4 | 0.25 |
| | BD | | | 0 | 4 | 0.0 |
| 1110c | CA | | ✓ | 1 | 4 | 0.25 |
| | CB | | | 0 | 4 | 0.0 |
| | CC | ✓ | ✓ | 2 | 4 | 0.5 |
| | CD | ✓ | ✓ | 2 | 4 | 0.5 |
| 1110d | DA | | ✓ | 1 | 4 | 0.25 |
| | DB | | | 0 | 4 | 0.0 |
| | DC | | | 0 | 4 | 0.0 |
| | DD | ✓ | ✓ | 2 | 4 | 0.5 |

FIGURE 11

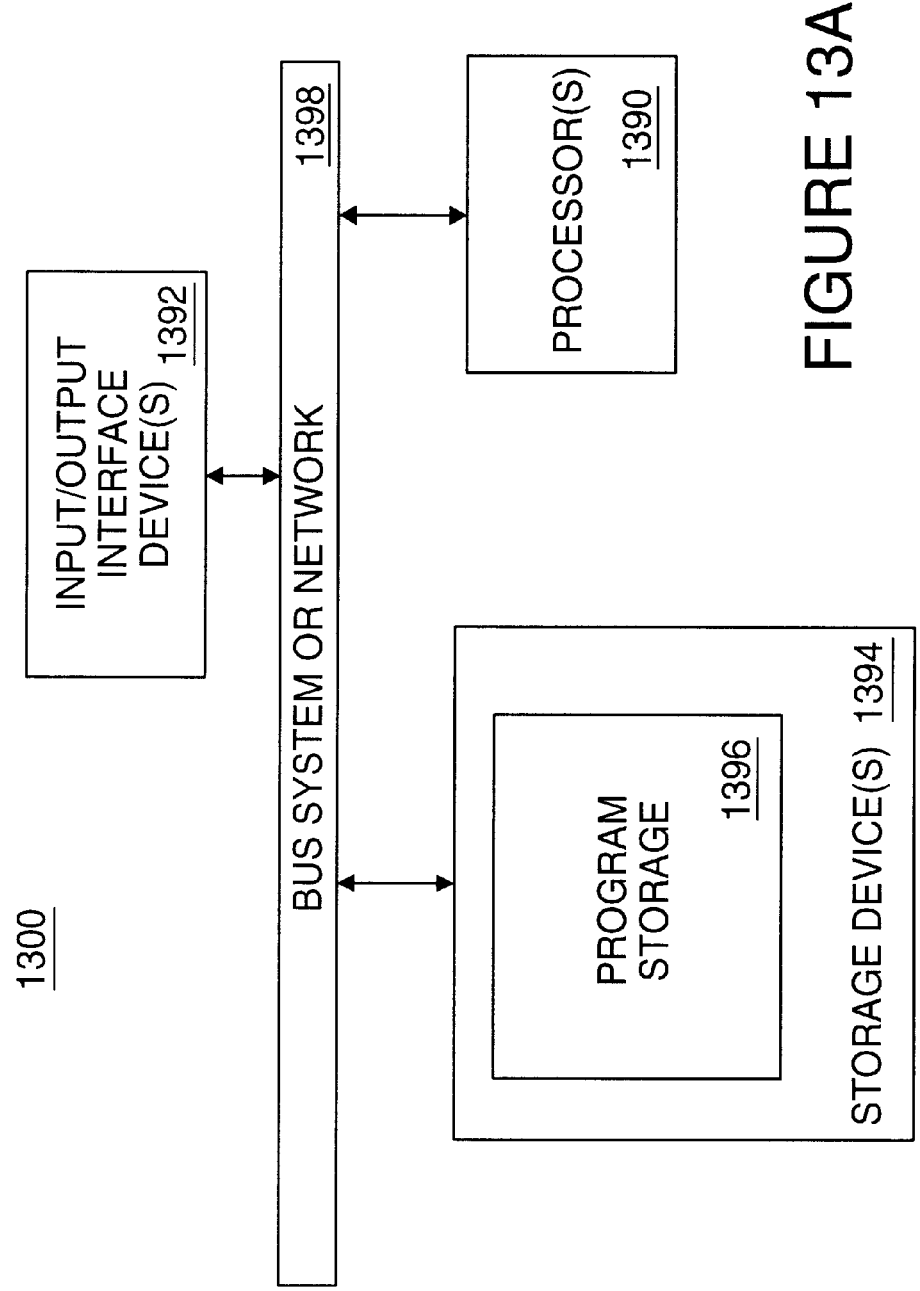

METHODS AND APPARATUS FOR DETERMINING OR INFERRING INFLUENTIAL RUMORMONGERS FROM RESOURCE USAGE DATA

BACKGROUND OF THE INVENTION

1. Field of the Invention

The present invention concerns methods and apparatus for analyzing resource usage data, such as Internet web site usage data for example, to infer users who communicate with, and influence, other users. Marketing information may then be targeted to such influential users with the hope that they will pass on such information to, and influence, other users.

2. Related Art

Marketing—Categories of Target Audiences

Traditionally, marketing professionals have classified people to determine the value of targeting marketing information to them. More specifically, people have been classified as (a) general, (b) prospective, and (c) qualified. "Prospective" people are those that have shown some interest in a relevant marketing area. For example, people that have purchased a number of airline tickets over the past year may be "prospects" for hotel and car rental marketing information. "Qualified" people are those that can actually purchase the goods or services being marketed. For example, a ten (10) year old viewing the Internet site of Ford Motor Corporation may have shown an interest in a particular car (and thus may be "prospect") but is too young to drive, and most likely afford, a car (and thus might not be "qualified").

Advertising on the Internet

Recently, new conduits for presenting marketing information have begun to mature. More specifically, in recent decades, and in the past five to ten years in particular, computers have become interconnected by networks by an ever increasing extent; initially, via local area networks (or "LANs"), and more recently via the Internet. The proliferation of networks, in conjunction with the increased availability of inexpensive data storage means, has afforded computer users unprecedented access to a wealth of data (also referred to as "content" or "resources"). Moreover, the use and evolution of the hyper-text mark-up language (or "HTML"), as well as search engines (such as Alta Vista™ for example) and hierarchical listings of content (such as YAHOO™ for example) permit people to more easily find content of interest to them. Hence, companies may target marketing information to people more likely to be interested in their goods and/or services. For example, a mutual fund company may place an advertisement on an Internet site which provides stock market information.

Though, as discussed above, the Internet has provided companies with a new conduit to present marketing information in a more targeted manner, Internet users recognize that advertisements do not necessarily provide objective information. Thus, a better way of disseminating marketing information, to increase the impact of such marketing information, is needed.

SUMMARY OF THE INVENTION

The inventors have recognized that Internet users, and other consumers for that matter, are often best influenced by a trusted colleague, friend, expert, commentator, or reviewer. The present invention provides a better way of disseminating marketing information by recognizing that there is a further category of person which will be referred to as an "influential rumormonger". An "influential rumormonger" may also fall into the above described categories of people—namely, (a) general, (b) prospective, or (c) qualified. However, an "influential rumormonger" will pass on marketing information, or information about goods or services, to others (hence the term "rumormonger"). Moreover, others will be influenced by the advice of an "influential rumormonger" (hence the term "influential"). By identifying "influential rumormongers", marketing information may be targeted to them, with the assumption that they will disseminate such information to others who will be influenced by the fact that the information came from an "influential rumormonger".

Having determined the importance of targeting marketing information to influential rumormongers, the present invention provides methods and apparatus for determining or inferring influential rumormongers from resource usage data, such as Internet usage data for example. Basically, the present invention uses resource usage data to infer degrees of influence between users. Once such inferences are made, a directed graph representation of the users and the degrees of influence between the users can be generated. "Influential rumormongers" can be determined, using a greedy graph covering algorithm for example, from the directed graph. In this way marketing information can be efficiently targeted and disseminated. Further, application content and/or a user interface may be automatically personalized based on this additional information. If actual (explicit) data regarding the influence between users is known, such information may be used to improve or replace the inferred influence associated with at least some of the edges.

BRIEF DESCRIPTION OF THE DRAWINGS

FIG. 7 is a table of exemplary input data used to illustrate the first process of FIG. 3.

FIG. 8 is a table of intermediate data generated by the first process of FIG. 3 in response to the exemplary input data of FIG. 7.

FIG. 10 is a table of exemplary input data used to illustrate the second process of FIG. 5.

FIG. 11 is a table of intermediate data generated by the second process of FIG. 5 in response to the exemplary input data of FIG. 10.

FIG. 13A is a high level block diagram of a system which may be used to perform the present invention.

DETAILED DESCRIPTION

Figure 1:
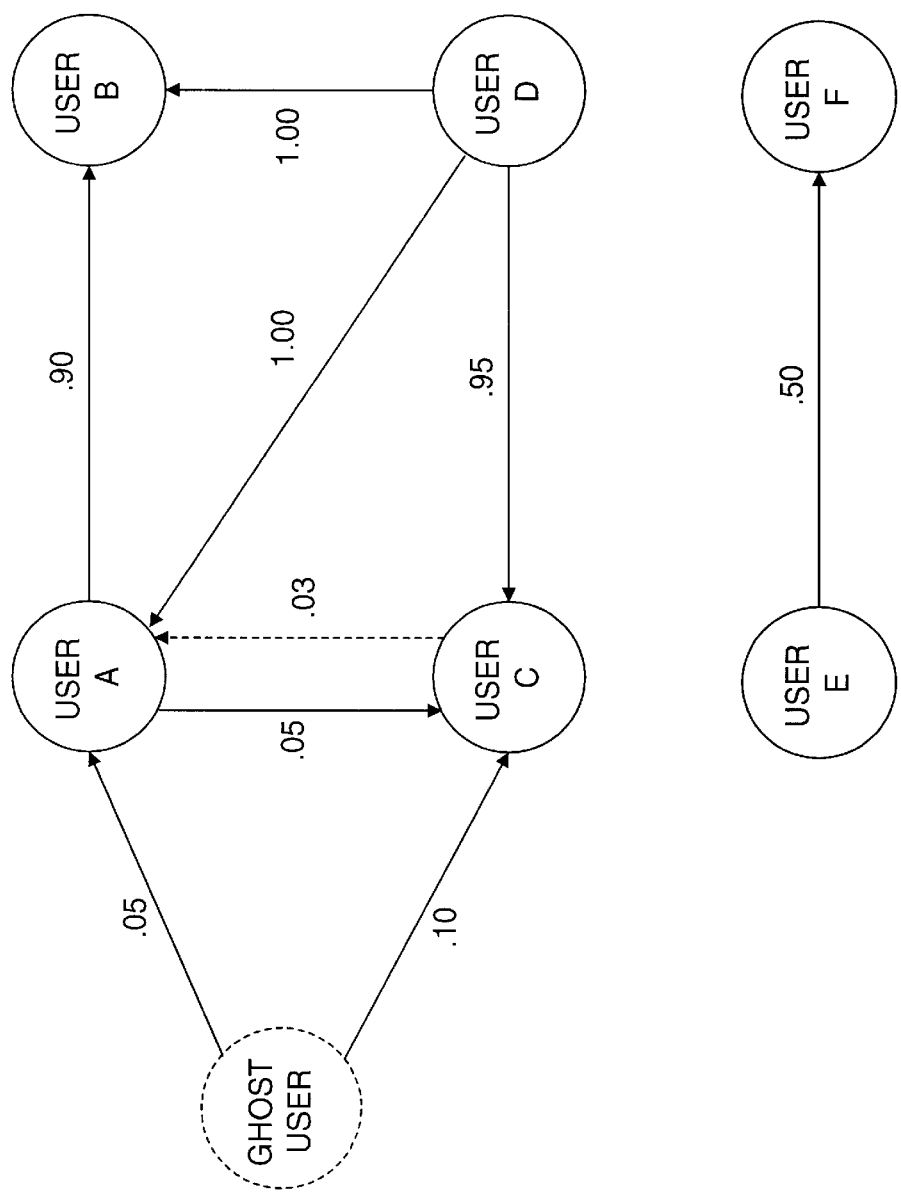
FIG. 1 depicts a directed graph which can be used to represent a probability that a user will influence another user.

The present invention concerns novel apparatus and methods for determining or inferring "influential rumormongers" to which marketing information may be targeted. The following description is presented to enable one skilled in the art to make and use the invention, and is provided in the context of a particular application and its requirements. Various modifications to the preferred embodiment will be apparent to those skilled in the art, and the general principles set forth below may be applied to other embodiments and applications. Thus, the present invention is not intended to be limited to the embodiments shown.

Purpose of Invention

Generally speaking, the purpose of the present invention is to determine information to allow marketing information to be disseminated in an optimal manner such that it reaches and influences many people. As discussed above, the Internet has provided a new conduit for presenting marketing information to people. The use of e-mail over the Internet has also exploded. Other means of communication, such Internet telephone calls and video calls, are emerging and are expected to increase substantially in the future. In the context of the Internet, the purpose of the present invention is to determine or infer "influential rumormongers" from Internet usage data. More specifically, Internet servers (or "sites", or "websites") can log information such as a unique identifier for users, a unique identifier (e.g., a URL or Uniform Resource Locator) for resources (such as HTML pages, MPEG files, etc.) requested by the users, and a date and time stamp of such requests. Based on the temporal nature of such usage data, the present invention infers users who may be classified as "influential rumormongers". Once identified, marketing information can be targeted to such "influential rumormongers" with the belief that they will pass such information to other users and influence other users.

"Influential Rumormongers"

To reiterate, an "influential rumormonger" may fall into the above described categories of people—namely, (a) general, (b) prospective, or (c) qualified. However, in addition, an "influential rumormonger" will pass on marketing information or information about goods or services to others (hence the term "rumormonger"). Such dissemination of information may take place directly, via an in-person conversation, telephone, video call, mail or e-mail, for example, or indirectly, via a hearsay conversation, a televised appearance, an appearance in print media, or a posting on an Internet site. For example, if A is a trusted personal friend of B, A may directly communicate to B (e.g., in person, via mail, e-mail, telephone, videophone, etc.), "I know that you're looking for a new car. Check out the web-page on the new Ford Taurus at www.ford.com." If A is a member of a holistic medicine newsgroup, A may communicate to the group, "For interesting information on the anti-inflammatory properties of garlic, see the article at www.garlicworld.com." If A is a movie reviewer, A may post a movie review (e.g., in a newspaper, on a television show, on an Internet site, etc.) which states, "I recommend 'The Lion King' as a great family movie. You can find clips at its website www.disney.com." Moreover, others will be influenced by the advice of an "influential rumormonger" (hence the term "influential"). That is, others will visit the recommended web-site or buy the recommended goods or services in response to a recommendation by an "influential rumormonger".

Directed Graph Representation of Information Dissemination on the Internet

The dissemination of information may be depicted as a directed graph as shown in FIG. 1. The vertices may represent users. Users may be individual people, an individual computer, a company, a local area network, a group, etc. In the context of the Internet, the vertices may correspond to Internet users who have visited an Internet web site. The numbers assigned to the edges of the graph correspond to a probability that the user corresponding to the originating vertex will communicate with, and influence, the user corresponding to the destination vertex.

Referring to FIG. 1, user A communicates with, and influences, user B 90 percent of the time and user C 5 percent of the time. User D always communicates with, and influences, users A and B, and communicates with, and influences, user C 95 percent of the time. User E communicates with, and influences, user F 50 percent of the time. User A takes an action, apparently influenced by no one (i.e., a "ghost user") 5 percent of the time. Similarly, user C takes an action, apparently influenced by no one (i.e., a "ghost user") 10 percent of the time. Such "communications" may be direct (e.g., in person, via mail, e-mail, telephone, video phone, etc.) or indirect (e.g., via hearsay conversation, television, print media, Internet posting, etc.)

Note that users may influence each other. For example, referring to users A and C of FIG. 1, user A communicates with and influences user C 5 percent of the time as stated above. However, as shown in the dashed line, user C may also communicate with and influence user A 3 percent of the time. Note also that the probabilities associated with vertices entering or exiting any node need not add to 1.0.

Once the values of the vertices (i.e., users) and the values of the edges (i.e., probability that one user influences another) of the directed graph are known, "influential rumormongers" can be determined from the directed graph using known greedy, graph covering, algorithms for example. Other public or proprietary algorithms may also be used to determine "influential rumormongers" from directed graphs. The challenge thus becomes to generate a directed graph with appropriate values for the vertices and edges.

Determining Values of a Directed Graph

Determining Vertices

In the context of the Internet, users can be uniquely recognized, though not necessarily identified, by so-called "cookies". More specifically, when a user "visits" an Internet site, a cookie is generated by the resource server at the Internet site, provided to the user's computer, and stored at the user's computer. Users may be identified if they voluntarily provide identifying information (e.g., name, address, Internet address, e-mail address, etc.). Alternative means for recognizing or identifying users may be used.

Determining and/or Inferring Edge Values

There are a number of ways to gather data for determining the values of edges in the directed graph. The most direct way may be to ask users, by means of web-based questionnaires for example, (a) who they communicate with, (b) who they influence, (c) who communicates with them, and/or (d) who influences them. Unfortunately, this way of data gathering relies on users to volunteer information.

Another way to gather data for determining the values of edges in the directed graph may be to monitor "chat rooms" so that it can be determined who communicates with whom.

"Newsgroups" may be monitored to identify those who start "threads" (i.e., a sequence of related communications). E-mail forwarding information can be used to determine who forwarded a communication to whom. Unfortunately, it is difficult to gather this data. Moreover, some users may have an expectation of privacy in their chat room, newsgroup, and e-mail communications, even if the content of their communications is not monitored. Such expectations of privacy may lead to legal or voluntarily placed limitations on such data gathering. Furthermore, although this data may indicate whom communicates with whom, it does not indicate user influence.

Finally, a "referred from" embedded link may be used to inform an Internet site where a visiting user "came from", i.e., the preceding Internet site that the user visited.

Thus, gathering "explicit" information to identify "influential rumormongers" is difficult. The present invention uses resource usage log data to infer data of a directed graph from which "influential rumormongers" may be determined.

The fact that a user requests a resource after another already requested that same resource does not necessarily mean that they were influenced by the first requester. However, such influence may be inferred. For example, once an Internet user has visited an Internet web site, they may tell others about it. This may take place directly, via an in-person conversation, mail, telephone, video call, e-mail, for example, or indirectly, via a hearsay conversation, television, the print media, or a posting on an Internet web site.

The Use of E-Mail as a Means to Disseminate Information

As discussed above, the use of e-mail over the Internet has dramatically increased over the past five years and is expected to increase. Moreover, most modern e-mail programs permit other information in electronic form (such as a word processing document, or a JPEG image for example) to be "attached" to the e-mail. Hence, a wealth of information may be disseminated quickly, and relatively inexpensively, via e-mail.

Greedy (or Covering) Algorithm for Determining "Influential Rumormongers" from Directed Graph Referring back to FIG. 1, in the directed graph the vertices may represent users and the edges may represent a probability that a user corresponding to a vertex at the destination of the edge will request a resource within a "memory length" time period of a request for that resource by a user corresponding to the vertex at the origin of the edge. Influence may be inferred from these probabilities. Hence, "influential rumormongers" can be derived from such a graph with known edge values using a greedy algorithm to "cover" the graph. Although such algorithms are known to those skilled in the art, their operation in this context is briefly described for the reader's convenience.

Initially, a first user (also referred to as a "rumor starter") that maximizes the total number of people that will request a resource (or "know the rumor") within a time period (e.g., an "observation length" time period) is determined. Next, a second user (or "second starter") is determined that maximizes the number of users, that have not yet requested the resource, that will request the resource (or "know the rumor") within the observation length time period. This process continues for a predetermined number of rumor starters. The observation length time period may be set to be equal to the "memory length" time period, although it may be less than or greater than the "memory length" time period.

Structure of Exemplary System

Figures 2A, 2B:
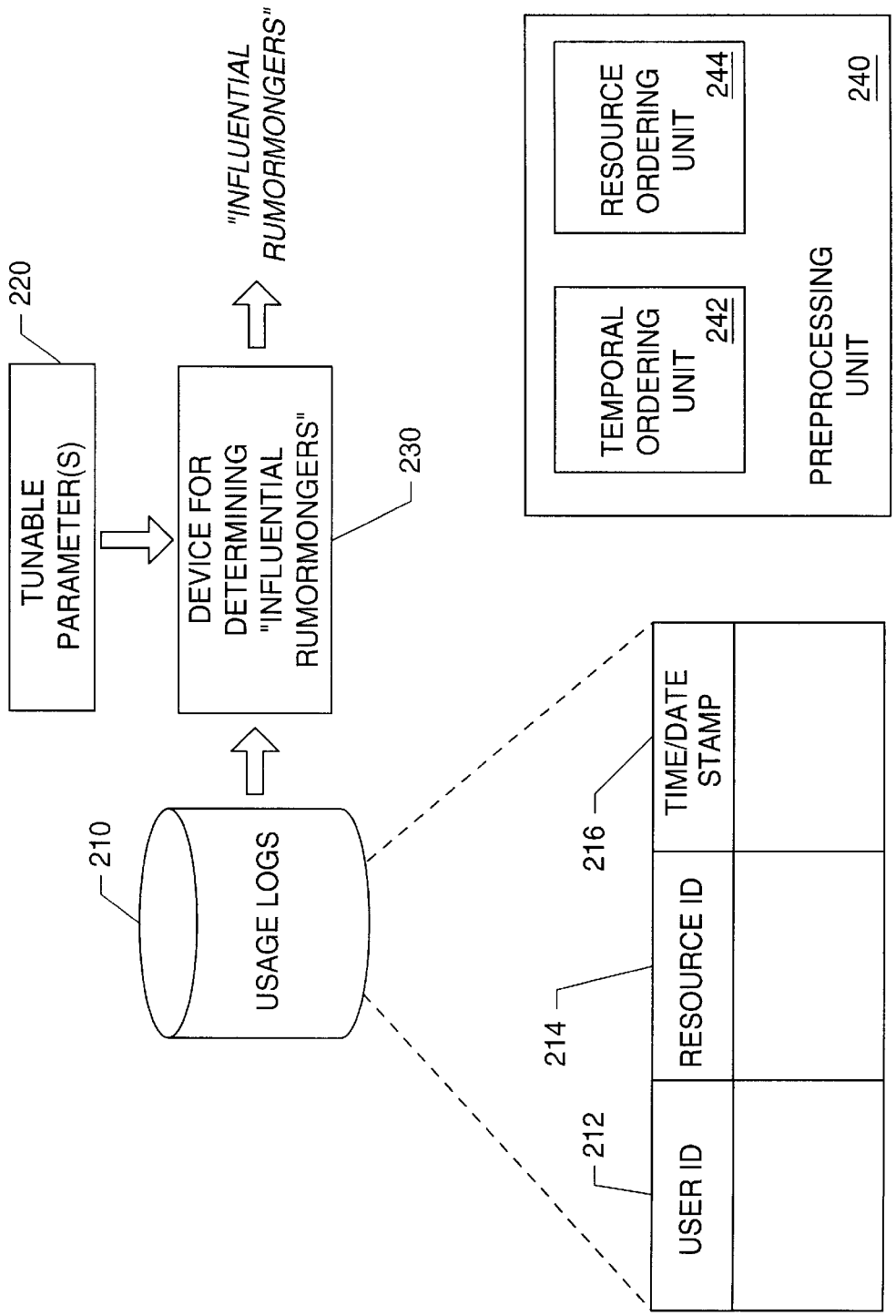
FIGS. 2a and 2b are high level block diagrams of an exemplary system which embodies the present invention.

FIG. 2a is high level block diagram of a system 200 for determining "influential rumormongers" in accordance with the present invention. Resource usage logs 210 and tunable parameter(s) 220 are provided to a device for determining "influential rumormongers" 230. Each of these components will be described below.

The resource usage logs 210, which may be compiled at a server for providing Internet resources or a web site, include records indicating when users accessed a resource at that resource server. Each of the records may include a user ID field 212, a resource ID field 214, and a time/date stamp ID field 216. The user ID field may include information that uniquely tags, but does not necessarily identify, a user that has requested information from the web site. For example, a so-called "cookie" may be used to uniquely label users visiting a web site. To reiterate, if the user is a computer networked to the Internet, a cookie may be generated by the resource server, provided to the computer, and stored at the computer. The resource ID field 214 is used to identify the resource requested by the user. The resource may be an HTML page, a RealAudio audio data, a JPEG image, an MPEG video, etc. The resource ID field 214 may contain the URL of the resource. Finally, the time/date stamp field 216 may include information which identifies when a particular user requested a particular resource. The time/date stamp field may have the format MM/DD/YY:HR/MN/SC, where MM is a two digit month value, DD is a two digit date value, YY is a two digit year value, HR is a two digit military time hour value, MN is two digit minute value, and SC is a two digit second value.

The tunable parameter(s) 220 may include predetermined or user entered "memory length", "observation length" and "number of rumor starters" parameters used by methods of the present invention.

Referring to FIGS. 2a and 13A, the device for determining "influential rumormongers" 230 may include processor(s) 1390, input/output interface device(s) 1392, and storage device(s) 1394, all of which may communicate information via bus system or network 1398. The storage device(s) 1394 may include a program storage area 1396 for storing machine executable instructions. The processor(s) 1390 may execute the stored machine executable instructions (or machine executable instructions received from an external source) to effect the steps and processes of the present invention discussed in detail below.

Figure 13B:
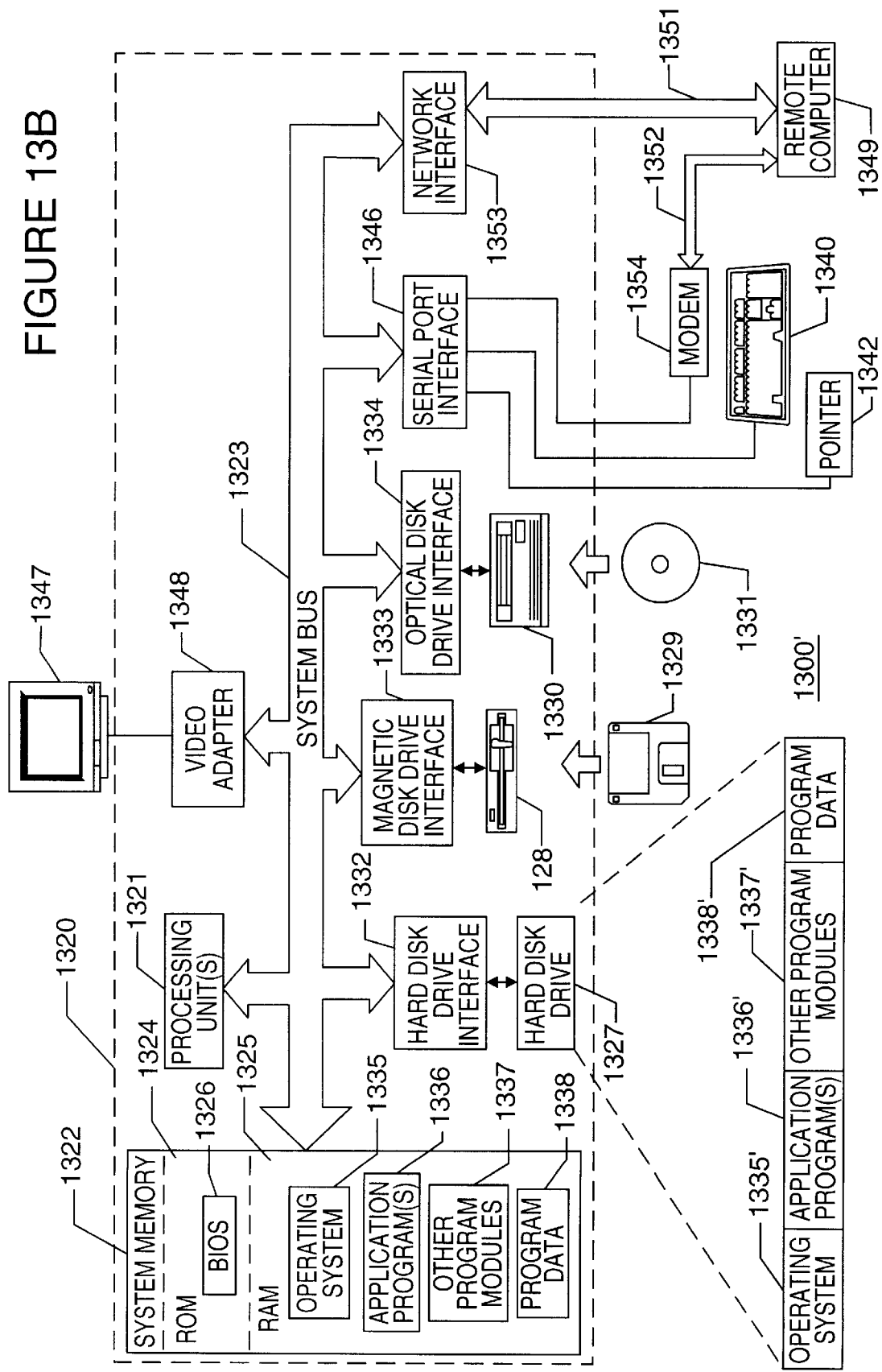
FIG. 13B is a block diagram of a computer environment in which the present invention may operate.

FIG. 13B and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be effected by other apparatus. Program modules may include routines, programs, objects, components, data structures, etc. that perform a task(s) or implement particular abstract data types. Moreover, those skilled in the art will appreciate that at lease some aspects of the present invention may be practiced with other configurations, including hand-held devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 13B, an exemplary apparatus 1300' for implementing at least some aspects of the present invention includes a general purpose computing device in the form of a conventional personal computer 1320. The personal computer 20 may include a processing unit 1321, a system memory 1322, and a system bus 1323 that couples various system components including the system memory to the processing unit 1321. The system bus 1323 may be any of several types of bus structures including a memory bus or memory controller, a peripheral bus, and a local bus using any of a variety of bus architectures. The system memory may include read only memory (ROM) 1324 and/or random access memory (RAM) 1325. A basic input/output system 1326 (BIOS), containing basic routines that help to transfer information between elements within the personal computer 1320, such as during start-up, may be stored in ROM 1324. The personal computer 20 may also include a hard disk drive 1327 for reading from and writing to a hard disk, (not shown), a magnetic disk drive 1328 for reading from or writing to a (e.g., removable) magnetic disk 1329, and an optical disk drive 1330 for reading from or writing to a removable (magneto) optical disk 1331 such as a compact disk or other (magneto) optical media. The hard disk drive 1327, magnetic disk drive 1328, and (magneto) optical disk drive 1330 may be coupled with the system bus 1323 by a hard disk drive interface 1332, a magnetic disk drive interface 1333, and a (magneto) optical drive interface 1334, respectively. The drives and their associated storage media provide nonvolatile storage of machine readable instructions, data structures, program modules and other data for the personal computer 1320. Although the exemplary environment described herein employs a hard disk, a removable magnetic disk 1329 and a removable optical disk 1331, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 1323, magnetic disk 1329, (magneto) optical disk 1331, ROM 1324 or RAM 1325, such as an operating system 1335, one or more application programs 1336, other program modules 1337, and/or program data 1338 for example. A user may enter commands and information into the personal computer 1320 through input devices, such as a keyboard 1340 and pointing device 1342 for example. Other input devices (not shown) such as a microphone, joystick, game pad, satellite dish, scanner, or the like may also be included. These and other input devices are often connected to the processing unit 1321 through a serial port interface 1346 coupled to the system bus. However, input devices may be connected by other interfaces, such as a parallel port, a game port or a universal serial bus (USB). A monitor 1347 or other type of display device may also be connected to the system bus 1323 via an interface, such as a video adapter 1348 for example. In addition to the monitor, the personal computer 1320 may include other peripheral output devices (not shown), such as speakers and printers for example.

The personal computer 1320 may operate in a networked environment which defines logical connections to one or more remote computers, such as a remote computer 1349. The remote computer 1349 may be another personal computer, a server, a router, a network PC, a peer device or other common network node, and may include many or all of the elements described above relative to the personal computer 1320. The logical connections depicted in FIG. 13B include a local area network (LAN) 1351 and a wide area network (WAN) 1352, an intranet and the Internet.

When used in a LAN, the personal computer 1320 may be connected to the LAN 1351 through a network interface adapter (or "NIC") 1353. When used in a WAN, such as the Internet, the personal computer 1320 may include a modem 1354 or other means for establishing communications over the wide area network 1352. The modem 1354, which may be internal or external, may be connected to the system bus 1323 via the serial port interface 1346. In a networked environment, at least some of the program modules depicted relative to the personal computer 1320 may be stored in the remote memory storage device. The network connections shown are exemplary and other means of establishing a communications link between the computers may be used.

Figure 9:
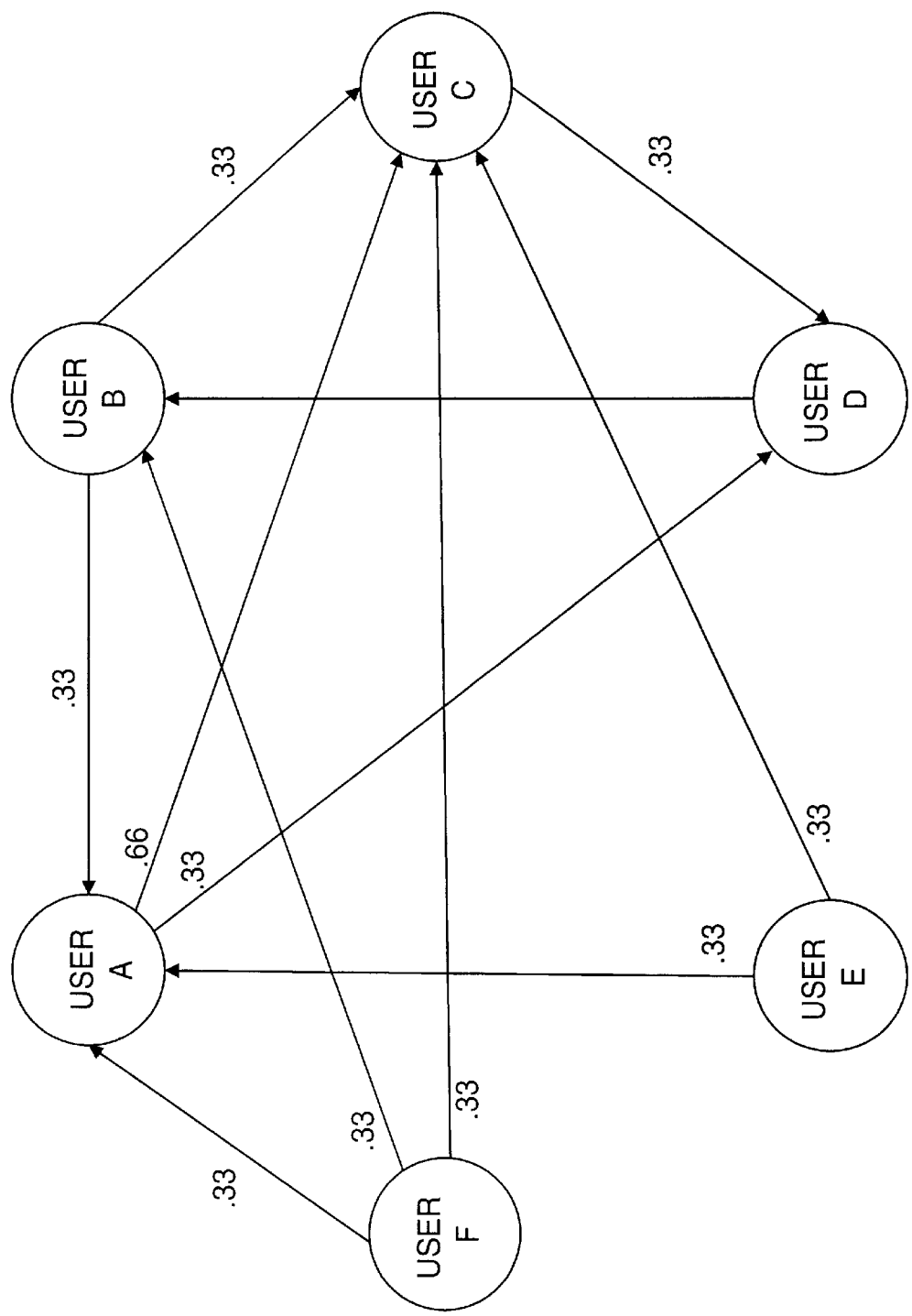
FIG. 9 is a directed graph generated by the first process of FIG. 3 in response to the exemplary input data of FIG. 7.

Referring to FIG. 2b, a preprocessing unit 240 may be arranged between the resource usage logs 210 and the device for determining "influential rumormongers" 230. The preprocessing unit 240 may include a unit for ordering 242 the usage log records by time information in the time/date stamp fields 216 and a unit for ordering 244 the time ordered usage log records by resource information found in the resource ID field 214. FIGS. 7 and 9 depict exemplary usage log information ordered primarily by resource ID, and secondarily by time and date.

Figure 14:
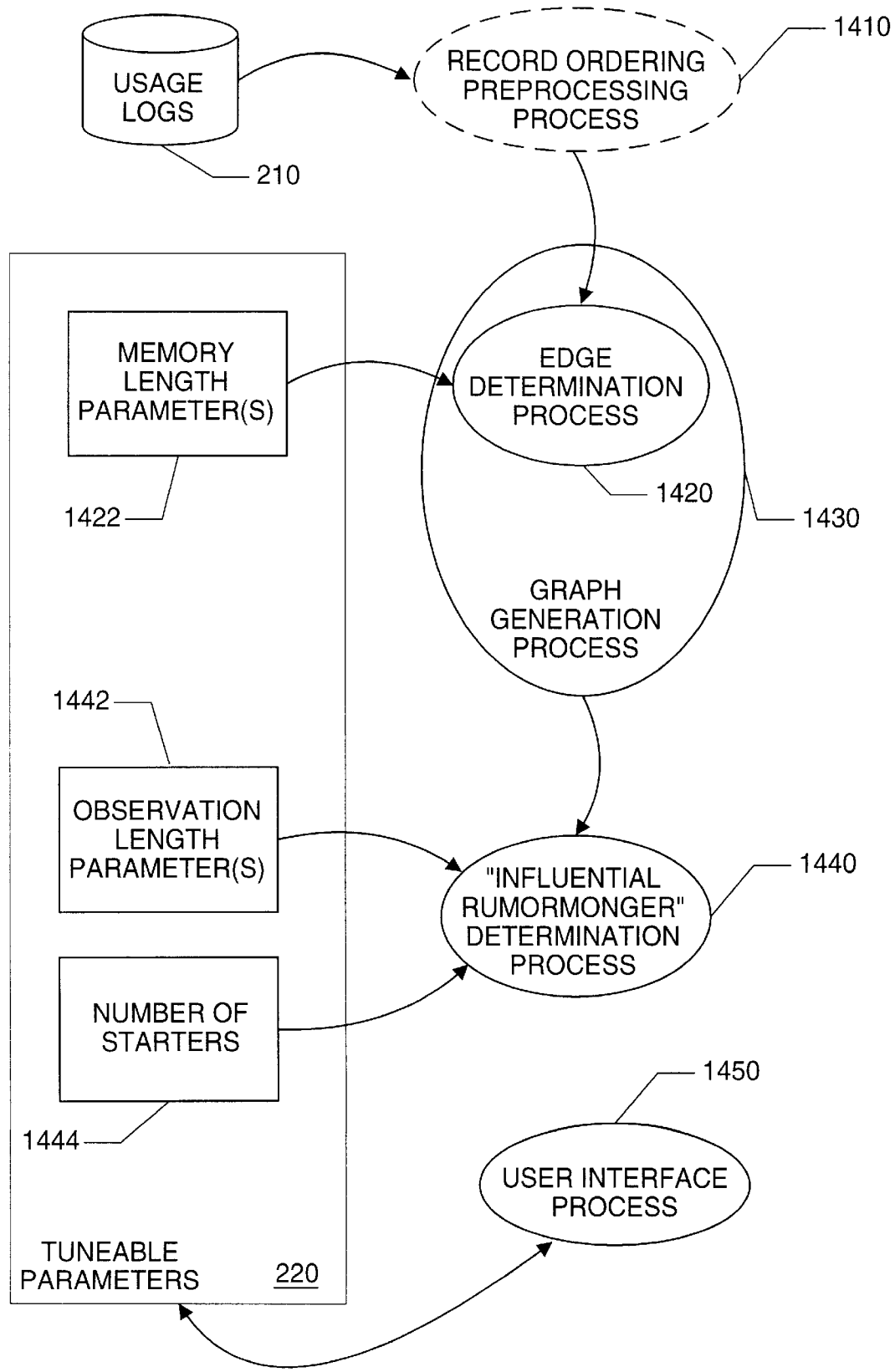
FIG. 14 is a diagram of processes which may be used to perform the present invention.

FIG. 14 is a diagram of processes which may be used to effect the present invention. Basically, a record order preprocessing process (or more generally, a record sorter) 1410, a graph generation process (or more generally, a graph generator) 1430 which includes an edge determination process (or more generally, an edge determination facility) 1420, an "influential rumormonger" determination process (or more generally, an influential rumormonger determination facility) 1440, and a user interface process (or more generally, a user interface) 1450 are provided. The recorder ordering preprocessing process 1410 (optional, as indicated by dashed lines) receives resource usage log data from an external source 210 and provides ordered usage log records to the edge determination process 1420 of the graph generation process 1430. Using a "memory length" parameter(s) 1422, the edge determination process 1420 determines values associated with edges between nodes corresponding to users. This information is used by the graph generation process 1430 to generate a directed graph having nodes corresponding to the users and the determined edges. The "influential rumormonger" determination process 1440 uses the determined directed graph, as well as an "observation length" value 1442 and a "number of rumor starters" value 1444 to determine a rank ordered list of "influential rumormongers".

As shown, the memory length value 1422, the observation length value 1442, and the number of rumor starters value 1444 are tunable parameters that may be changed via the user interface process 1450.

Referring back to FIG. 13A, each of the processes may be carried out as instructions executed by the processors) 1390. The instructions may be stored in program storage 1396 or received from an external source via input/output interface device(s) 1392.

The edge determination process 1420 is an important aspect of the present invention. Below, two (2) alternative methods for determining or inferring edge values from usage log data are disclosed. Both methods are statistically sound and have been found to be efficacious in determining "influential rumormongers" from experimental data.

Count Ratio Process for Determining Graph Edges

Figure 3B:
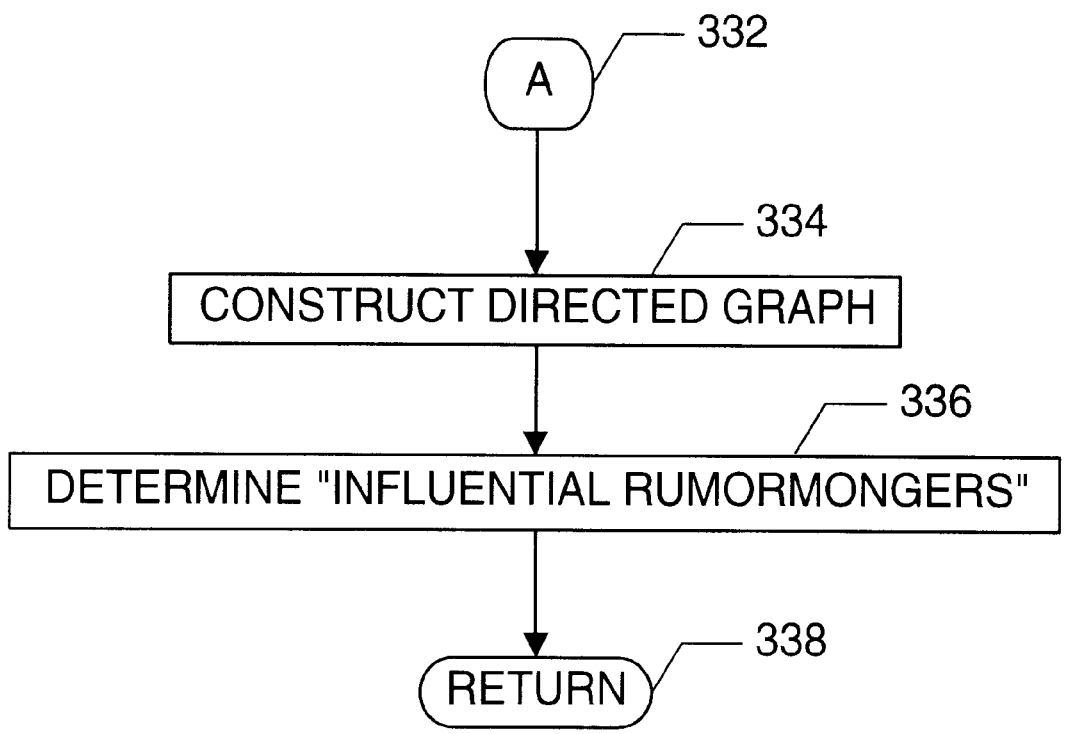
FIG. 3 depicts the arrangement of FIGS. 3a and 3b which, collectively, depict a flow diagram of a first process for determining "influential rumormongers" in accordance with the present invention.

FIGS. 3a and 3b are collectively flow diagrams of a first process 300 for determining "influential rumormongers"

from resource usage log data. (Recall processes 1420, 1430, and 1440 of FIG. 14.) First, as shown in step 302 shown in FIG. 3a, a memory length parameter(s) is accepted. The memory length parameter(s) may be a predetermined value (s) stored in storage device(s) 1394 or may be accepted from a user via the input/output interface device(s) 1392. (Recall user interface process 1450.) In one version of this method, a single memory length parameter is used. In another, alternative method of the present invention, different memory length parameters may be assigned to different resources.

As shown in steps 304 through 330 shown in FIG. 3a, for each set of users "t" (a talker) and "l" (a listener), an edge value $EDGE_{t,l}$ is determined. More specifically, steps 308, 310, 312, 314, 316, 318, 320, and 322 are looped through for all users "t" (See steps 328, 330, and 304) and all other users "l" (See steps 324, 326, and 306). First, as shown in step 308, ALPHA and BETA count values corresponding to a current "talker" and "listener" are initialized (e.g., set to zero). Next, as shown in steps 312 and 314, for a particular set of users "t" and "l", for all resources, if the user "l" "follows" the user "t", a count $ALPHA_{t,l}$ is incremented. That is, if the user "l" requests a particular resource within the memory length time period after user "t" requested that resource (and user "l" did not request the resource before user "t"), then the count $ALPHA_{t,l}$ is incremented. Otherwise (i.e., if user "l" did not request the resource after user "t" or if user "l" requested the resource both before and after user "t"), as shown in step 316, a count $BETA_{t,l}$ is incremented. These steps 312, 314, and 316 are carried out for each resource as shown by steps 318, 320, and 310. Thereafter, as shown in step 322, a value $EDGE_{t,l}$ associated with an edge from the user "t" to the user "l", is determined. The edge value is determined based on the ALPHA and BETA values. More specifically, the edge value can be determined in accordance with the following formula:

$$EDGE_{t,l} = \frac{ALPHA_{t,l}}{ALPHA_{t,l} + BETA_{t,l}}$$

To reiterate, the above processing takes place for all users "l" (See steps 324, 326, and 306.) and "t" (See steps 328, 330 and 304.). Thereafter, processing continues, via node A 332, to step 334 in which a directed graph is constructed. Basically, the directed graph will include vertices corresponding to each of the users indicated by the user ID information of the usage log data. Edges between the vertices will have the values determined above. If the value of $ALPHA_{t,l}$ is zero for a particular talker and listener pair, the value of $EDGE_{t,l}$ will also be zero. In such instances, there will be no edge from the vertex corresponding to user "t" to the vertex corresponding to user "l" (although there may be an edge from the vertex corresponding to user "l" to user "t"). Indeed, in most cases, the graph will be sparse in that many vertices will not be connected to each other by an edge.

As shown in step 336, once the graph is constructed, "influential rumormongers" may be determined therefrom, using known greedy graph covering algorithms for example. Processing then continues at return node 338.

Performance of the Count Radio Process

In an environment in which users communicate and influence most other users, information (also referred to as "rumors") spreads fast regardless of who starts the rumors. That is, if the directed graph includes edges between most of the vertices and those edges have relatively high associated probabilities, then rumors propagate fast because, in essence, all of the users are influential rumormongers. Thus, selecting particular influential rumormongers to start the rumor is not critical. However, as discussed above, it is believed that most users do not influence the resources requested by other users. That is, a directed graph representation would be relatively sparse—it would have relatively few edges.

Figure 4:
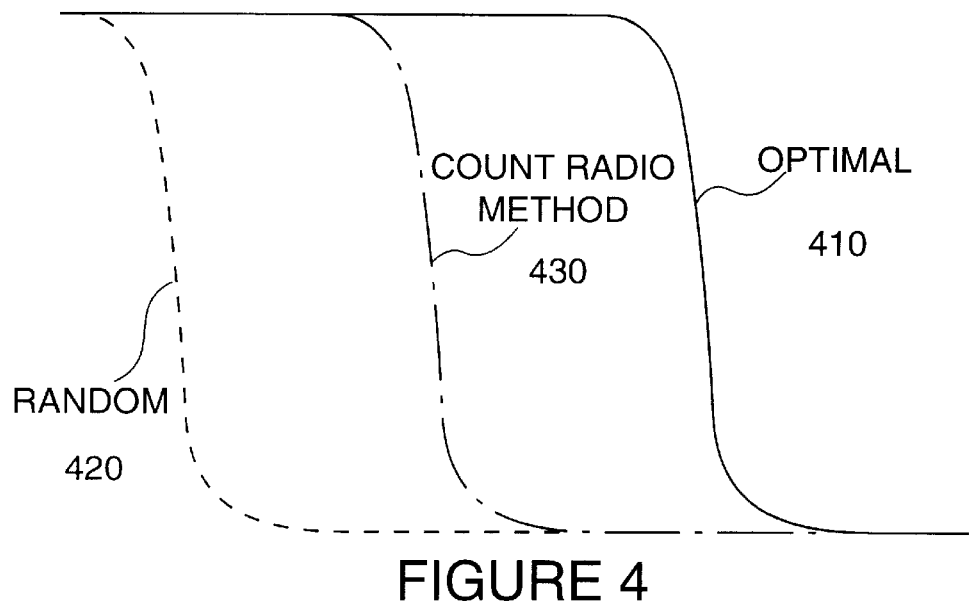
FIG. 4 is a graph of a performance of the first process of FIG. 3.

FIG. 4 depicts experimental results in a graph having 1000 vertices, 1500 edges, 30 users that can find out about a rumor on their own (i.e., connected to a ghost vertex), 150 resources (or rumors), a memory length of one (1) day, observation length of four (4) days, 30 initial users supplied with the rumor, three (3) simulations run to estimate the total spread of the rumor for a given graph, and all 1000 users considered in the greedy graph covering algorithm to find influential rumormongers. The solid line 410 shows the rumor spread when the optimal rumor starters are determined based on the greedy graph covering algorithm assuming known edge values. The dashed line 420 shows the rumor spread when rumor starters are selected at random. The dot-dashed line 430 shows the spread of the rumor when "influential rumormongers" are selected based on edge values determined in accordance with the process 300 of FIG. 3 and a greedy graph covering algorithm. Thus, the inferences drawn from the usage data permit "influential rumormongers" to be selected to help spread the rumor faster than by using random users to start the rumor.

Although the results of the count ratio method of inferring edge values is not as good as using known (i.e., actual) edge "influence" data, since the actual edge values cannot be easily determined (recall that such data would require information volunteered by users or methods which might violate a user's expectation of privacy and which would not show influence), picking starters to optimally spread the rumor as shown by the solid line 410 may, at this time, not be practical. Naturally, if such information is known, it can be used to refine or replace some or all of the inferred values associated with the edges.

Frequency Matrix Process for Determining Graph Edges

FIG. 5 is a flow diagram of a second process 500 for determining "influential rumormongers" from usage data. This process 500 is similar to the process 300 discussed above with respect to FIG. 3 but determines the edge values of the directed graph in a slightly different way. First, as shown in step 502, a memory length parameter(s) is accepted. The memory length parameter(s) may be a predetermined value(s) stored in storage device(s) 1394 or may be accepted from a user via the input/output interface unit(s) 1392. (Recall user interface process 1450.) In one version of this method, a single memory length parameter is used. In another, alternative method of the present invention, different memory length parameters may be assigned to different resources.

Figure 5A:
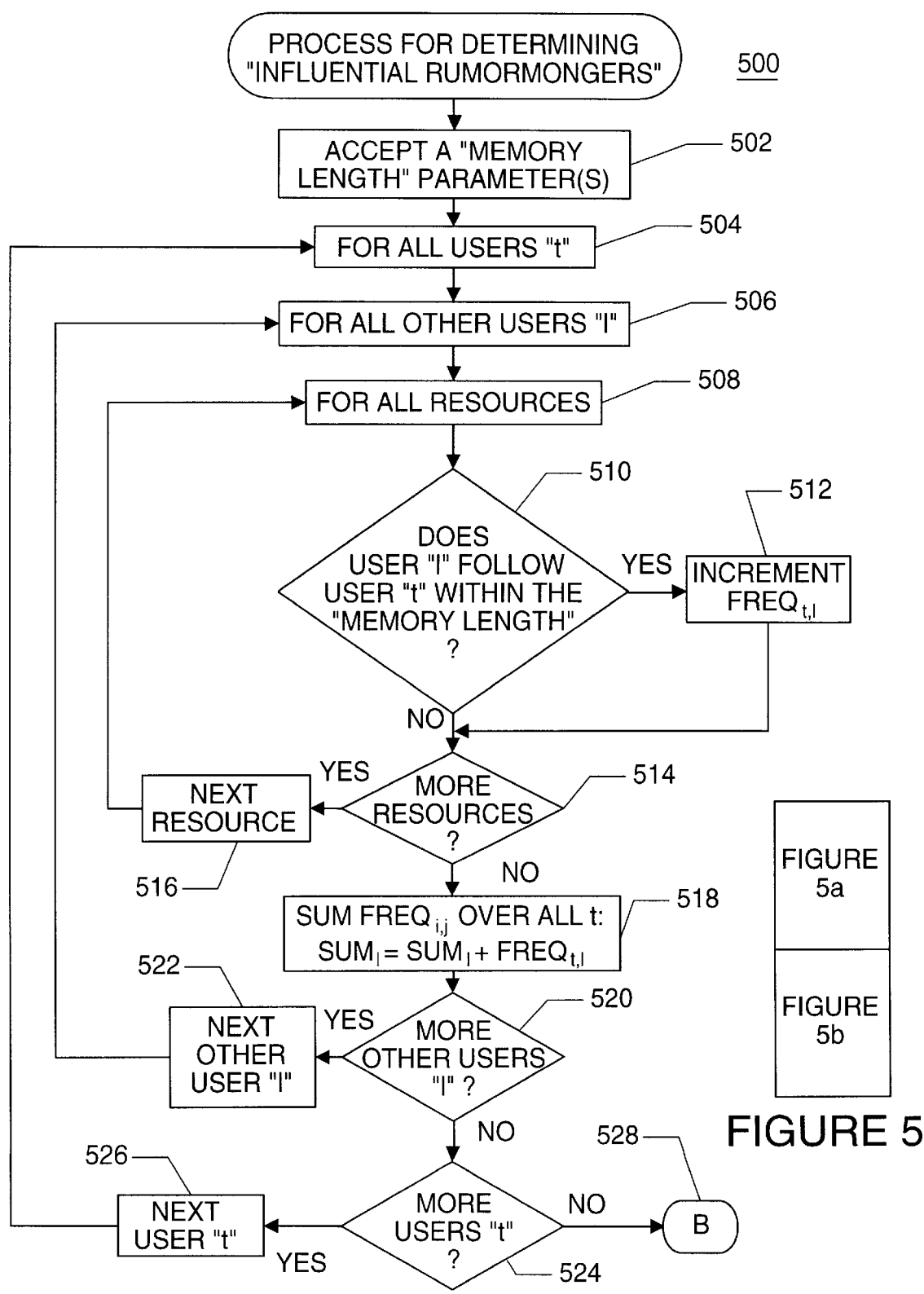
FIG. 5 depicts the arrangement of FIGS. 5a and 5b which, collectively, depict a flow diagram of a second process for determining "influential rumormongers" in accordance with the present invention.
Figure 5B:
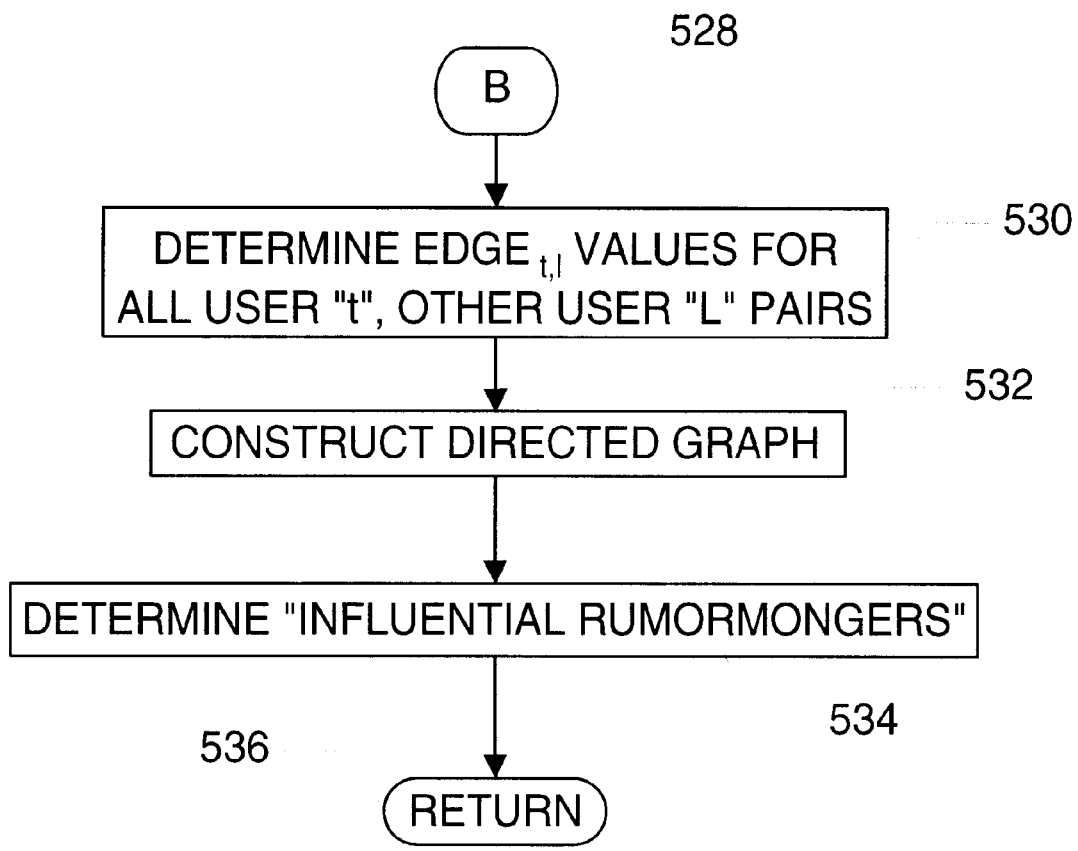

As shown in steps 504 through 530 in FIGS. 5a and 5b, for each set of users "t" (a talker) and "l" (a listener), an edge value $EDGE_{t,l}$ is determined. More specifically, steps 510, 512, 514, 516, and 518 are looped through for all users "t" (See steps 524, 526, and 504) and all other users "l" (See steps 520, 522, and 506). As shown in steps 510 and 512, for a particular set of users "t" and "l", if the user "l" "follows" the user "t", a count $FREQ_{t,l}$ is incremented. That is, if the user "l" requests a particular resource within the memory length time period after user "t" requested that resource, then the count $FREQ_{t,l}$ is incremented. These steps 510 and 512 are carried out over all resources as shown in steps 514, 516, and 508. As shown in step 518, a running sum of the frequency count is determined for all talkers of a given listener.

Once the frequency values of all talker, listener pairs of users, and the sum frequency values of all listener users are determined, processing continues, via node B 528, to step 530. As shown in step 530, the edge values between all of the talker users and all of the listener users are determined. The $EDGE_{t,l}$ values may be determined by the following formula:

$$EDGE_{t,l} = \frac{FREQ_{t,l}}{\sum_{x \in all\ takers\ t} FREQ_{x,l}} = \frac{FREQ_{t,l}}{SUM_l}$$

The above processing takes place for all users "t" and "l". Thereafter, as shown in step 532, a directed graph is constructed. Basically, the directed graph will include vertices corresponding to each of the users indicated by the user ID information of the resource usage log data. Edges between the vertices will have the values determined above. If the value of $FREQ_{t,l}$ of a particular talker and listener pair is zero, the value of $EDGE_{t,l}$ will also be zero. In such instances, there will be no edge from the vertex corresponding to user "t" to the vertex corresponding to user "l" (although there may be an edge from the vertex corresponding to user "l" to user "t"). Indeed, in most cases, the graph will be sparse in that many vertices will not be connected by an edge.

As shown in step 534, once the graph is constructed, "influential rumormongers" may be determined therefrom, using known greedy graph covering algorithms for example. Processing then continues at return node 536.

Basically, the frequency matrix method differs from the count ratio method in that it considers the ratio of communications from a talker "t" to a listener "l" to the sum of all communications of all users to the listener "l". On the other hand, the count ratio method considers the ratio of all communications to all possible opportunities to communicate.

Performance of Frequency Matrix Process

Figure 6:
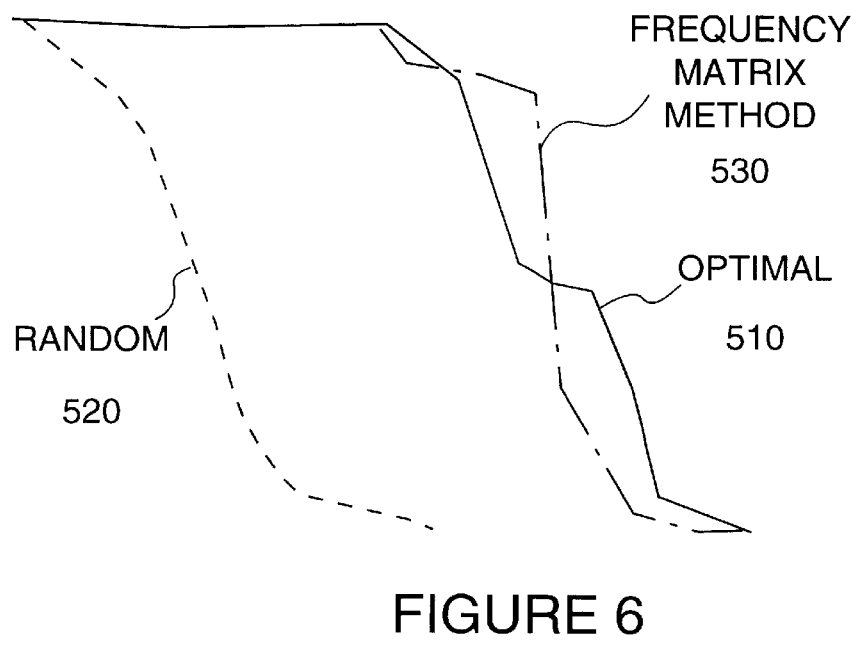
FIG. 6 is a graph of a performance of the second process of FIG. 5.

Though the second (frequency matrix) process 500 did not perform as well as the first (count ratio) process 300 for relatively large graphs, it did provide good results on small graphs. FIG. 6 depicts experimental results in a graph having ten (10) vertices, fifteen (15) edges, no users that can find out about a rumor on their own (i.e., connected to a ghost vertex), five (5) resources (or rumors), a memory length of one (1) day, an observation length of four (4) days, two (2) initial users supplied with the rumor, 100 simulations run to estimate the total spread of the rumor for a given graph, and all users considered in the greedy graph covering algorithm to find influential rumormongers. The solid line 510 shows the rumor spread when the optimal rumor starters are determined based on the greedy graph covering algorithm assuming known edge values. The dashed line 520 shows the rumor spread when rumor starters are selected at random. The dot-dashed line 530 shows the spread of the rumor when "influential rumormongers" are selected based on edge values determined in accordance with the process 500 of FIG. 5 and a greedy graph covering algorithm. Thus, the inferences drawn from the usage data permit "influential rumormongers" to be selected to help spread the rumor faster than by using random users to start the rumor, and indeed, approach the optimal speed of rumor propagation.

To reiterate, since the actual edge values cannot be easily determined, picking starters to optimally spread the rumor as shown by the solid line 510 may, at this time, not be practical. Naturally, if such information is known, it can be used to refine or replace some or all of the inferred values associated with the edges.

Operation

Having had described the function and structure of the embodiments and methods of the invention, the operation of the two alternative methods of the present invention on two small sets of usage logs is described.

Example of Operation of the Count Ratio Process

The operation of the first (count ratio) process 300 for determining influential rumormongers on an exemplary set of usage data will now be described with reference to FIGS. 3, 7, 8, and 9. The exemplary data includes six (6) users A, B, C, D, E, and F, three (3) resources 1, 2, and 3, and the first and second days of September 1997. For example, user F requested resource 1 at 1:00 PM on Sep. 1, 1997 and requested resource 3 at 7:15 AM on Sep. 1, 1997.

The table of FIG. 8 illustrates some intermediate results of the process 300 for determining influential rumormongers on the set of usage data shown in FIG. 7. The first column 810 of the table lists sets of users. The first listed user is a reference user (also referred to as a "talker"). The second listed user (also referred to as a "follower" or "listener") is another user that may or may not request (or "follow") the same resource as that requested by the reference user within the memory length time period. In this example, the memory length is assumed to be twenty four (24) hours. On the left side of the table, the sets 810a through 810f correspond to the loops carried out for all users "t". (See, e.g., steps 328, 330 and 304 of FIG. 3.)

The second 820, third 830, and fourth 840 columns of the table represent whether or not the first listed user requested resource 1, 2, and 3, respectively, and the second listed user requested that same resource within the memory length time period. For example, referring to set 810a, since user A requested resource 1 at 2:45 PM of Sep. 1, 1997 and user C requested resource 1 at 9:00 PM of Sep. 1, 1997 (i.e., within the 24 hour memory length), user C "followed" user A to resource 1 as indicated by the check. Similarly, since user D requested resource 1 at 2:30 PM of Sep. 2, 1997 (i.e., within the 24 memory length), user D followed user A to resource 1 as indicated by the check. Finally, since user A requested resource 2 at 10:00 PM on Sep. 2, 1997 and user C requested resource 2 at 10:30 PM that same day, user C "followed" user A to resource 2.

Referring back to steps 304 through 330 of FIG. 3, ALPHA or BETA values are incremented for each user (talker, listener) pair over all of the resources. The fifth column 850 includes the ALPHA count, while the sixth column 860 includes the BETA count. Referring again to the set 810a, since user B never followed user A to any of the three resources, $ALPHA_{A,B}$ is 0 and $BETA_{A,B}$ is 3. Since user C follower user A to resources 1 and 2 but not 3, $ALPHA_{A,C}$ is 2 and $BETA_{A,C}$ is 1. Since user D followed user A to resource 1 but not resource 2 or 3, $ALPHA_{A,D}$ is 1 and $BETA_{A,D}$ is 2. Finally, since neither of users E or F followed user A to any of the three resources, $ALPHA_{A,E}$ and $ALPHA_{A,F}$ are 0 and $BETA_{A,E}$ and $BETA_{A,F}$ are 3.

The seventh column 870 of the table includes the edge values, which are based on the corresponding ALPHA and BETA values. Recall that the edge values may be determined as follows:

$$EDGE_{t,l} = \frac{ALPHA_{t,l}}{ALPHA_{t,l} + BETA_{t,l}}$$

Thus $EDGE_{A,B}$ is 0 (=0/(0+3)), $EDGE_{A,C}$ is 0.66 (=2/(2+1)), $EDGE_{A,D}$ is 0.33 (=1/(1+2)), $EDGE_{A,E}$ is 0 (=0/(0+3)), and $EDGE_{A,F}$ is 0 (=0/(0+3)).

The other intermediate values of the table 800 are similarly determined.

FIG. 9 depicts the resulting directed graph. A greedy covering algorithm is then used to select an "influential rumormonger(s)" from the users.

Example of Operation of the Frequency Matrix Process

The operation of the second (frequency matrix) process 500 for determining influential rumormongers on an exemplary set of usage data will now be described with reference to FIGS. 5, 10, 11, and 12. The exemplary data includes four (4) users, A, B, C, and D, two (2) resources 1 and 2, and the first, second, and third days of September 1997. For example, user A requested resource 1 at 10:00 PM on Sep. 1, 1997 and requested resource 2 at 6:30 PM on Sep. 2, 1997.

The table of FIG. 11 illustrates some intermediate results of the process 500 for determining influential rumormongers on the set of resource usage data shown in FIG. 10. The first column 1110 of the table lists sets of users. The first listed user is a reference user (also referred to as a "talker"). The second listed user (also referred to as a "follower" or "listener") is another user that may or may not request (or "follow") the same resource as that requested by the reference user within the memory length time period. In this example, the memory length is assumed to be twenty four (24) hours. On the left side of the table, the sets 1110a through 1110d correspond to the loops carried out for all users "t". (See, e.g., steps 524, 526 and 504 of FIG. 5.)

The second 1120 and third 1130 columns of the table represent whether or not the first listed user requested resource 1 and 2, respectively, and the second listed user requested that same resource within the memory length time period. For example, referring to set 1110a, since user A requested resource 1 at 10:00 PM of Sep. 1, 1997 and user B requested resource 1 at 11:15 PM of that same day (i.e., within the 24 hour memory length), user B "followed" user A to resource 1 as indicated by the check. Similarly, since user C requested resource 1 at 2:00 PM of Sep. 2, 1997 (i.e., within the 24 memry length), user C followed user A to resource 1 as indicated by the check. Finally, since user A requested resource 2 at 6:30 PM on Sep. 2, 1997 and user B requested resource 2 at 5:45 PM on Sep. 3, 1997, user B "followed" user A to resource 2.

Referring back to steps 508, 510, 512, 514, and 516 of FIG. 5, FREQ values are incremented for each user (talker, listener) pair over all of the resources. The fourth column 1140 includes the FREQ count. Referring again to the set 1110a, since user B followed user A to both of the two resources, $FREQ_{A,B}$ is 2. Since user C followed user A to resource 1 but not 2, $FREQ_{A,C}$ is 1. Finally, since user D did not follow user A to either of the two resources, $FREQ_{A,D}$ is 0.

The fifth column 1150 of the table includes a sum of the frequency values for a listener over all talkers. Thus, the sum of the FREQ values for user $A = FREQ_{A,A} + FREQ_{B,A} + FREQ_{C,A} + FREQ_{D,A} = 2 + 0 + 1 + 1 = 4$. Similarly, the sum of the FREQ values for user B is 4 (=2+2+0+0), the sum of the FREQ values for user C is 4 (=1+1+2+0) and the sum of the FREQ values for user D is 4 (=0+0+2+2).

The sixth column 1160 of the table includes the edge values, which are based on the corresponding FREQ and sum of FREQ. Recall that the edge values may be determined as follows:

$$EDGE_{t,l} = \frac{FREQ_{t,l}}{\sum_{x \in all\ talkers} FREQ_{x,l}} = \frac{FREQ_{t,l}}{SUM_l}$$

Thus, for example, $EDGE_{C,A}$ is 0.25 (=1/4), $EDGE_{C,B}$ is 0 (=0/4), $EDGE_{C,C}$ is 0.5 (=2/4)), and $EDGE_{C,D}$ is 0.25 (=1/4).

Other intermediate values of the table 11 are similarly determined.

Figure 12:
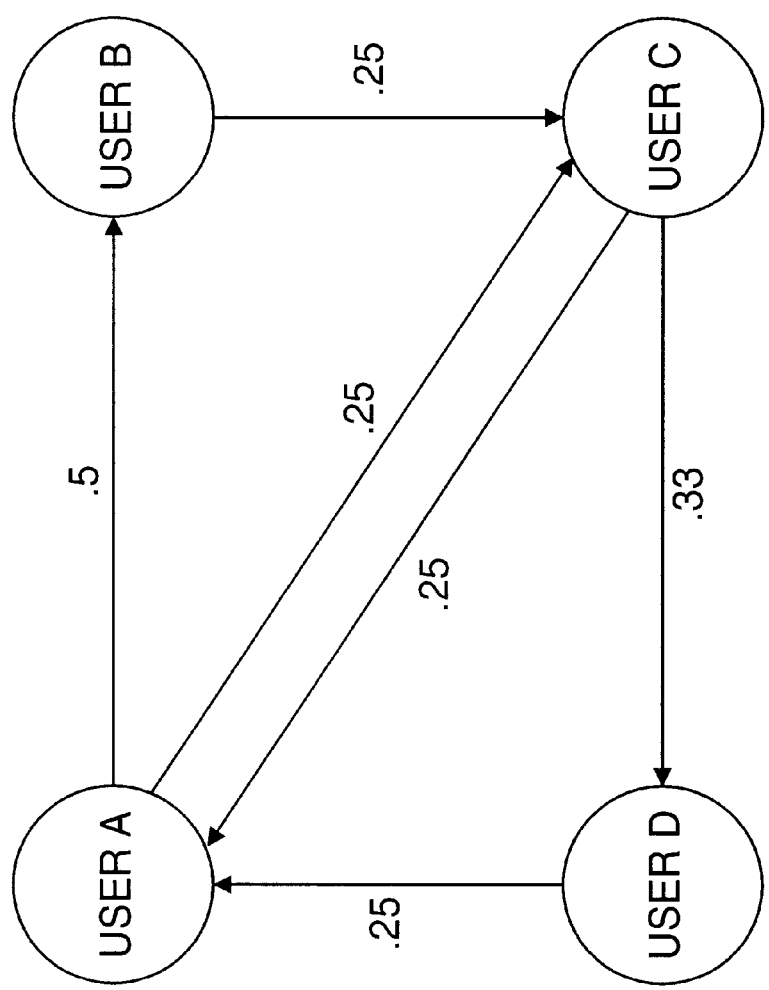
FIG. 12 is a directed graph generated by the second process of FIG. 5 in response to the exemplary input data of FIG. 10.

FIG. 12 depicts the resulting directed graph. A greedy covering algorithm is then used to select an "influential rumormonger(s)" from the users.

Conclusion

Thus the present invention uses resource usage data to infer degrees of influence between users. Once such inferences are made, a directed graph representation of the users and the degrees of influence between the users can be generated. "Influential rumormongers" can be determined, using a greedy graph covering algorithm for example, from the directed graph. In this way marketing information can be efficiently targeted and disseminated. If actual (explicit) data regarding the influence between users is known, such information may be used to improve or replace the inferred influence associated with at least some of the edges.

What is claimed is:

1. A computer-implemented method for ascertaining an influential rumormonger from amongst a plurality of users through a directed graph from resource usage log data including records having (i) user information, (ii) resource identification information, and (iii) resource request time information, the method comprising steps of:

a) inferring a corresponding measure of influence between each of a plurality of pairs of said users from the usage log data based on (i) the user information, (ii) the resource identification information, (iii) the resource request time information, and (iv) a memory length parameter so as to define a plurality of influence measures, wherein, for each of said pairs of users, one of the users in said each pair appears to exhibit influence, as reflected in said corresponding influence measure, over action taken by another one of the users in said one pair;

b) generating the directed graph having, for said each one of the pairs of users, first and second vertices corresponding to the one and the other one, respectively, of the users and having an edge connecting the first and second vertices and associated with the corresponding influence measure; and c) determining the influential rumormonger from amongst the users and the influence measures provided in the directed graph.

2. The computer-implemented method of claim 1 wherein the step of determining the influential rumormonger from the directed graph is carried out by applying a greedy graph covering algorithm to the directed graph.

3. The computer-implemented method of claim 2 wherein the step of determining the influential rumormonger from the directed graph includes sub-steps of accepting at least one of an observation length parameter and (b) a number of rumor starters parameter.

4. The computer-implemented method of claim 1 wherein the step of determining the influential rumormonger from the directed graph includes sub-steps of accepting at least one of (a) an observation length parameter and (b) a number of rumor starters parameter.

5. The computer-implemented method of claim 1 wherein the step of inferring the corresponding influence measure includes sub-steps of, for all of the users, defining a user in the plurality of users as a first user and all other ones of the plurality of users as second users:

i) for all resources, if one of the second users requests a resource after the first user has requested the resource, then incrementing a first count, otherwise incrementing a second count; and ii) inferring the corresponding influence measure between the first user, as said one user, and a corresponding one of the second users, as the other one of the users, based on the first count and the second count.

6. The computer-implemented method of claim 5 wherein the corresponding influence measure increases as a ratio of the first count to the second count increases.

7. The computer-implemented method of claim 5 further comprising the step of defining the corresponding influence measure by adding the first and second counts to generate a sum value, and dividing the first count by the sum value.

8. The computer-implemented method of claim 5 further comprising a step of:

c) determining the influential rumormonger from the directed graph by applying a greedy graph covering algorithm to the directed graph, wherein the step of determining at least one influential rumormonger from the directed graph includes a sub-step of:

i) accepting at least one of (a) an observation length parameter and (b) a number of rumor starters parameter.

9. The computer-implemented method of claim 8 wherein the observation length parameter is longer than the memory length parameter.

10. The computer-implemented method of claim 1 wherein the step of inferring the corresponding influence measure includes sub-steps of, for all of the users, defining a user in the plurality of users as a first user and all other ones of the plurality of users as second users:

i) for all resources, if one of the second users requests a resource within a time period defined by the memory length parameter after the first user requested the resource, then incrementing a first count, otherwise incrementing a second count; and ii) inferring the corresponding influence measure between the first user, as said one user, and a corresponding one of the second users, as the other one of the users, based on the first count and the second count.

11. The computer-implemented method of claim 10 wherein the corresponding influence measure increases as a ratio of the first count to the second count increases.

12. The computer-implemented method of claim 10 further comprising the step of defining the corresponding influence measure by adding the first and second counts to generate a sum value, and dividing the first count by the sum value.

13. The computer-implemented method of claim 10 further comprising a step of:

d) determining the influential rumormonger from the directed graph by applying a greedy graph covering algorithm to the directed graph, wherein the step of determining the influential rumormonger from the directed graph includes sub-steps of:

i) accepting at least one of (a) an observation length parameter and (b) a number of rumor starters parameter.

14. The computer-implemented method of claim 13 wherein the observation length parameter is longer than the memory length parameter.

15. The computer-implemented method of claim 1 wherein the step of inferring the corresponding influence measure includes sub-steps of, for all of the users, defining a user in the plurality of users as a first user and all other ones of the plurality of users as second users:

i) for all resources, incrementing a count if one of the second users requests a resource after the first user has requested the resource;

ii) summing counts, over all first users, associated with the second users to generate a sum associated with each of the second users; and iii) determining the corresponding influence measure between the first user, as said one user, and a corresponding one of the second users, as the other one of the users, based on the counts and the sums.

16. The computer-implemented method of claim 15 wherein the corresponding influence measure between the one and the other one of the users increases as a ratio of the count associated with the users to the sum increases.

17. The computer-implemented method of claim 15 further comprising the step of defining the corresponding influence measure as the count associated with the users divided by the sum.

18. The computer-implemented method of claim 1, wherein, if the corresponding influence measure is known from explicit data, then further performing a step of:

d) setting the corresponding influence measure inferred in step (a) with to an influence measure between said one and the other one of the users known from explicit data.

19. The computer-implemented method of claim 1, wherein, if an influence measure between users in any one of said pairs of users is known from explicit data, then further performing a step of:

d) refining the corresponding influence measure based on the influence measure known from explicit data.

20. The computer-implemented method of claim 1 wherein the users are computers and the resources are separate instances of content available to the users via a network.

21. A device for inferring an influential rumormonger from amongst a plurality of users from resource usage log data including records having (i) user information, (ii) resource identification information, and (iii) resource request time information, the device comprising:

a) a graph edge determination facility for determining a corresponding influence measure between each of a plurality of pairs of said users based on the user information, the resource identification information, the resource request time information, and a memory length parameter so as to define a plurality of influence measures, wherein, for each of said pairs of users, one of the users in said each pair appears to exhibit influence, as reflected in said corresponding influence measure, over action taken by another one of the users in said one pair; and b) an influential rumormonger determination facility for determining the influential rumormonger based on the corresponding influence measures between all the pairs of said users, the users, and an observation length parameter.

22. A device for ascertaining an influential rumormonger from amongst a plurality of users through a directed graph from resource usage log data including records having (i) user information, (ii) resource identification information, and (iii) resource request time information, the method comprising steps of:

- a) means for inferring [an] a corresponding measure of influence between each of a plurality of pairs of said users from the usage log data based on (i) the user information, (ii) the resource identification information, (iii) the resource request time information, and (iv) a memory length parameter so as to define a plurality of influence measures, wherein, for each of said pairs of users, one of the users in said each pair appears to exhibit influence, as reflected in said corresponding influence measure, over action taken by another one of the users in said one pair;
- b) a graph generator for generating the directed graph having, for said each one of the pairs of users, first and second vertices corresponding to the one and the other one, respectively, of the users and having an edge connecting the first and second vertices and associated with the corresponding influence measure; and
- c) an influential rumormonger determination facility for determining the influential rumormonger from amongst the users and the influence measures provided in the directed graph.

23. The device of claim 22 wherein the influential rumormonger determination facility applies a greedy graph covering algorithm to the directed graph.

24. The device of claim 23 wherein the influential rumormonger determination facility includes means for accepting at least one of (a) an observation length parameter and (b) a number of rumor starters parameter.

25. The device of claim 22 wherein the influential rumormonger determination facility includes means for accepting at least one of (a) an observation length parameter and (b) a number of rumor starters parameter.

26. A medium containing machine readable instructions which, when executed by a machine, effect the method of claim 1.

* * * * *

UNITED STATES PATENT AND TRADEMARK OFFICE
CERTIFICATE OF CORRECTION

PATENT NO. : 6,151,585
DATED : November 21, 2000
INVENTOR(S) : Steven J. Altschuler, Lani F. Wu, David Ingerman It is certified that error appears in the above-identified patent and that said Letters Patent is hereby corrected as shown below:

Column 9,
Line 61, Change "Radio" to -- Ratio --;

Column 13,
Line 42, Change "memry" to -- memory --; and

Column 17,
Line 7, Delete "[an]".

Signed and Sealed this

Eleventh Day of September, 2001

*Attest:*

*Attesting Officer*

NICHOLAS P. GODICI
*Acting Director of the United States Patent and Trademark Office*